United States Patent
Witt

[15] 3,659,676
[45] May 2, 1972

[54] SPRING MOTOR MECHANISM

[72] Inventor: Fenwick L. Witt, 630 Virginia Avenue, Boulder Creek, Calif. 95006

[22] Filed: Jan. 25, 1971

[21] Appl. No.: 109,131

[52] U.S. Cl. ......................................... 185/40 R, 185/40 B
[51] Int. Cl. ....................................................... F03g 1/00
[58] Field of Search ................. 185/40 R, 45, 40 B; 60/7 A

[56] References Cited

UNITED STATES PATENTS 2,154,699  4/1939  Richardson ........................ 185/40 R
2,182,529  12/1939  Wyrick ............................. 185/DIG. 1

Primary Examiner—Edgar W. Geoghegan
Attorney—Allen and Chromy

[57] ABSTRACT

A spring motor mechanism which is provided with a coil spring having one end attached to a power shaft and having the other end attached to an electric motor that is supported so as to describe an orbit around the spring during the winding of the spring when the motor is energized.

6 Claims, 3 Drawing Figures

PATENTED MAY 2 1972

3,659,676

INVENTOR.
FENWICK L. WITT

BY *Allen and Gromy*

ATTORNEYS

SPRING MOTOR MECHANISM

DESCRIPTION OF THE INVENTION

This invention relates to a spring motor mechanism which employs a coil spring and an electric motor for winding said spring.

An object of this invention is to provide an improved spring motor mechanism in which the spring motor is wound by an electric motor that describes an orbit around the spring during the winding of the spring.

Another object of this invention is to provide an improved spring motor mechanism that may be used for driving a movable vehicle, said mechanism being provided with an output shaft attached to the coil spring thereof, said mechanism also having an electric motor which is also attached to the coil spring for winding the spring when the motor is energized.

Still another object of this invention is to provide an improved spring motor mechanism with a coil spring having the inner end thereof attached to an output shaft for delivering power from the spring and having the outer end thereof attached to an electric motor which has the ends thereof supported by a gear system which causes the motor to orbit around the spring and wind the spring when the motor is energized.

Other and further objects of this invention will be apparent to those skilled in the art to which it relates from the following specification, claims and drawing.

In accordance with this invention there is provided a spring motor mechanism with a coil spring that is adapted to be wound by a motor which when energized rotates around the spring. The inner end of the spring is attached to a shaft which is supported by bearings and which rotates suitable gears when the coil spring is delivering power to the shaft. The gears may be used to drive various devices requiring power. The outer end of the coil spring is attached to an electric motor which is supported by gears attached to the outer ends of the motor shaft. These gears engage fixed gears which are supported by the housing of the device so that they are substantially concentric with the output shaft of the coil spring. Electric current is fed to the motor through brushes that engage slip rings supported on the inside of the housing so that when electric current is supplied to the motor it rotates around the coil spring and thereby winds the spring.

Additional features and details of this invention will be set forth in the following specification, claims and drawing in which, briefly:

Figure 3:
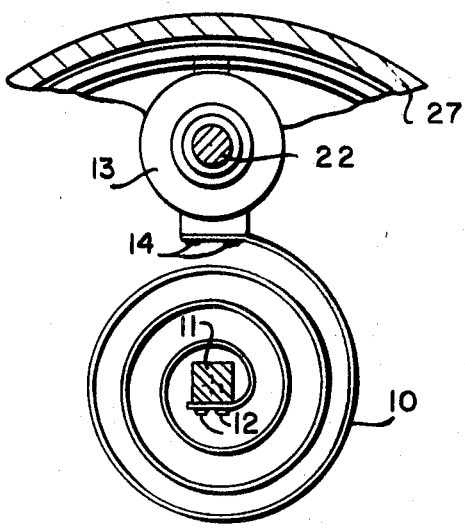
FIG. 3 is an end view of the coil spring and electric motor used for winding said spring.

Referring to the drawing in detail reference numeral 10 designates a coil spring having the inner end thereof attached to the square shaft 11 by bolts 12 as shown in FIG. 3. The holes through the spring 10 receiving the bolts may be large enough to provide a hook-type fastener and allow a certain amount of movement as the spring is wound or unwound so as to reduce the amount of sharp flexing of the spring against the shaft. The outer end of the coil spring 10 is attached to the housing on the electric motor 13 by bolts 14, and the holes through the spring receiving the bolts 14 may also be large enough so that these bolts function as hooks holding the spring attached to the motor permitting a certain amount of angular movement between the end of the spring and the motor housing. The outer ends of the square shaft 11 are supported by frame members 15 and suitable bearings 16 are provided for this purpose. Gears 17 are fixedly attached to the shaft 11 adjacent to the bearings 16. The gears 17 mesh with pinion gears 18 which are fixedly attached to the shafts 19 and shafts 19 are journalled in the inner and outer frame members 15 and 20, respectively, so that the pinion gears 18 are positioned between these frame members. The large gears 21 which form the output gears are fixedly attached to the pinion gears 18 and shafts 19. Thus, as the spring 10 rotates the shaft 11 and gears 17 the pinion gears 18 which mesh with the gears 17 drive the large gears 21 to provide the power output from the spring mechanism.

Figure 1:
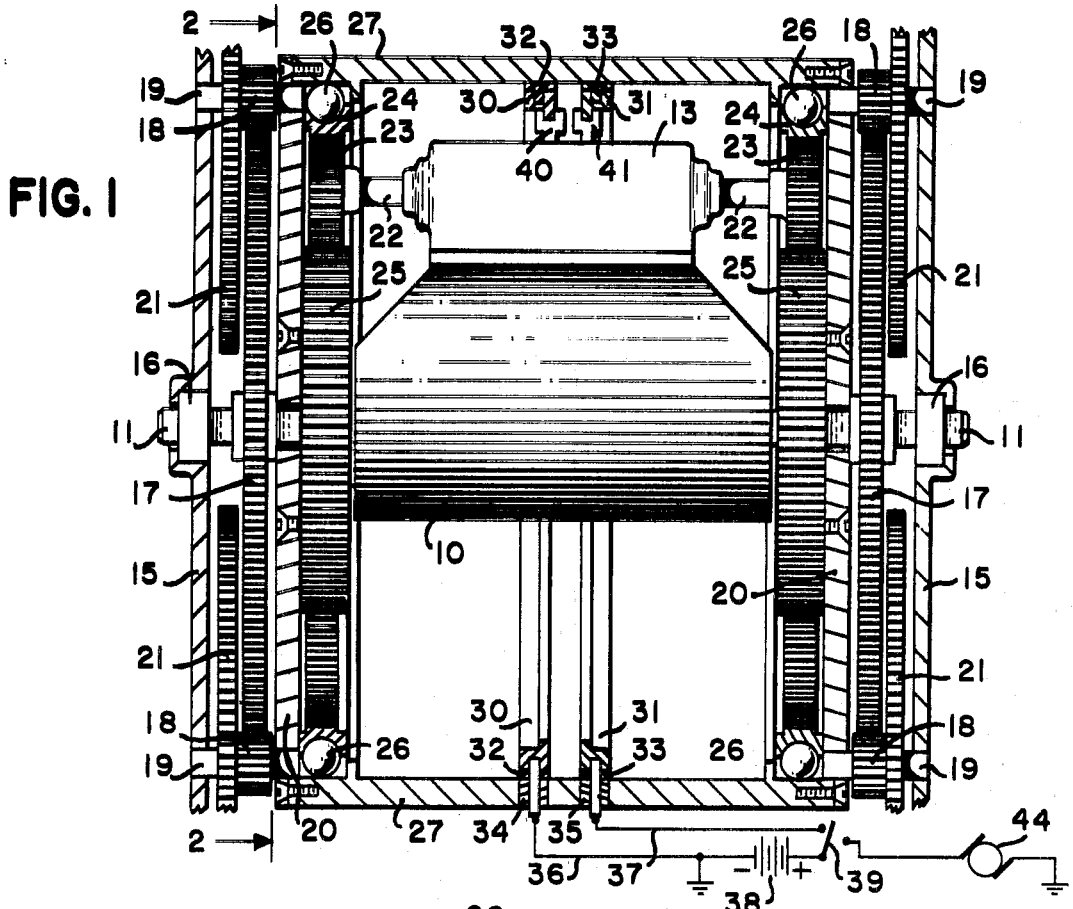
FIG. 1 is a side view of this spring motor mechanism with the housing thereof shown in cross section.
Figure 2:
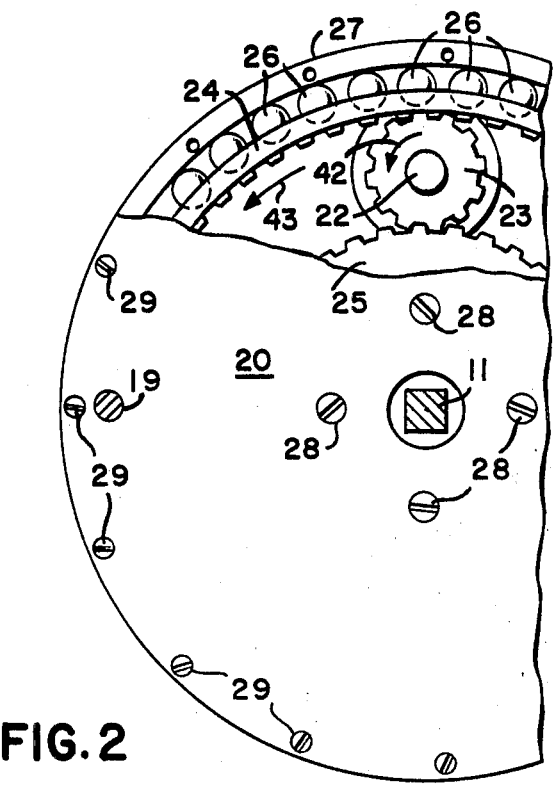
FIG. 2 is a fragmentary end view of this device with a portion of an end plate thereof broken away to show one of the electric motor supporting gears.

The electric motor 13 is provided with a shaft 22 and opposite ends of this shaft are provided with gears 23 which are fixedly attached thereto. Motor gears 23 mesh with the ring gears 24 and inner gear 25 as shown in FIG. 2. The ring gears 24 are supported by ball bearings 26 on the inside of the housing 27 which is of circular configuration. The inside of this housing is provided with races for the ball bearings 26 so that the ring gears 24 are rotatably supported thereby. Gears 25 are fixedly attached to the end plates 20 by bolts 28 and these end plates are attached to the housing 27 by suitable bolts 29.

Two slip rings 30 and 31 are supported by insulation 32 and 33, respectively, on the inside of the housing 27. These slip rings are provided with terminals which extend out of the housing through insulation 34 and 35, respectively, and these terminals are connected to the wires 36 and 37, respectively. Wire 36 is connected to the negative terminal of the battery 38 and wire 37 is connected to the positive terminal of this battery by the switch 39. Motor 13 is provided with brushes 40 and 41 which contact the slip rings 30 and 31, respectively, so that electric current is fed to the motor 13 through the slip rings 30 and 31 and brushes 40 and 41.

When the battery circuit is connected to the slip rings by closing switch 39 the motor 13 is energized and drives the shaft 22 thereof. Shaft 22 rotates the gears 23 in the direction indicated by the arrow 42 in FIG. 2 and the gears 25 which mesh with the motor gears 23 are stationary. The gears 23 carry the motor around the gears 25 in the direction indicated by the arrow 43. At the same time the ring gears 24 also move in the direction indicated by the arrow 43. The purpose of the ring gears 24 is to keep the gears 23 meshing with the gears 25 so that the motor 13 is caused to move around the gears 25. As the motor 13 moves around the gears 25 it winds the spring 10 and stores energy in this spring so that the spring is provided with power whereby it is enabled to rotate the square shaft 11 and provide power output to gears 21. Gears 21 may be coupled through suitable coupling arrangements to the driving wheels of a vehicle if desired so that the vehicle may be driven thereby and also the spring 10 may be wound through the gearing 17, 18 and 21 and shaft 11 when the vehicle is proceeding downhill.

While I have shown and described a preferred form of the invention, it is apparent that the invention is capable of variation from the forms shown so that the scope thereof should be limited only by the proper scope of the claims appended hereto.

What I claim is:

1. In a spring motor mechanism the combination comprising a coil spring, a shaft, means attaching said shaft to one end of said spring, gear means adapted to be driven by said shaft, an electric motor, means attaching the other end of said coil spring to said electric motor, and means supporting said motor so that said motor moves around said coil spring when energized and winds said coil spring.

2. In a spring motor mechanism the combination as set forth in claim 1, further characterized in that said motor supporting means includes a shaft provided to said motor and means attached to said motor shaft guiding said motor around said coil spring.

3. In a spring motor mechanism the combination as set forth in claim 2, further characterized in that said means attached to said motor shaft comprises a gear attached to each end of said motor shaft and fixed gears positioned on opposite sides of said coil spring engaged by said motor shaft gears.

4. In a spring motor mechanism the combination as set forth in claim 3, further characterized in that said motor and coil spring are positioned in a substantially cylindrical housing, and means supported on the inside of said housing feeding electric current to said motor.

5. In a spring motor mechanism the combination as set forth in claim 4, further characterized in that said means feeding electric current to said motor comprises slip rings and insulation means supporting said slip rings on said housing, and brushes supported by said motor contacting said slip rings.

6. In a spring motor mechanism the combination as set forth in claim 5, further characterized in that said housing is provided with end plates and said fixed gears are attached to the inside of said end plates.

* * * * *